United States Patent
Henry et al.

[15] 3,687,577
[45] Aug. 29, 1972

[54] PACKING FOR COMPRESSORS, PUMPS OR THE LIKE

[72] Inventors: Ralph E. Henry, Rixford, Pa.; Robert F. Kohanski, Westons Mills, N.Y.

[73] Assignee: Dresser Industries, Inc., Dallas, Tex.

[22] Filed: March 29, 1971

[21] Appl. No.: 129,064

[52] U.S. Cl. ................................... 417/437, 277/28
[51] Int. Cl. .................................................. F04b 19/00
[58] Field of Search .....417/901, 437; 277/28, 29, 75

[56] References Cited

UNITED STATES PATENTS

| | | | |
|---|---|---|---|
| 3,145,629 | 8/1964 | Gottzmann | 417/901 X |
| 3,194,568 | 7/1965 | Payne | 277/75 X |
| 3,334,906 | 8/1967 | Arnold | 277/29 X |

*Primary Examiner*—Carlton R. Croyle
*Assistant Examiner*—Frank McKenzie
*Attorney*—Robert W. Mayer, Thomas P. Hubbard, Jr., Daniel Rubin, Raymond T. Majesko, Roy L. Van Winkle, William E. Johnson, Jr. and Eddie E. Scott

[57] ABSTRACT

The improved annular packing members described hereinafter are arranged to be positioned within the cylinder of a compressor in encircling relationship to the plunger or rod reciprocating therethrough. The annular packing members have one or more annular grooves extending around the inner and outer peripheries forming an annular, pressure responsive lip thereon. The pressure responsive lip is located in juxtaposition with an adjacent packing member to provide a more efficient seal and to reduce the stress concentrations on the packing members resulting from the clamping load applied thereon during assembly.

10 Claims, 1 Drawing Figure

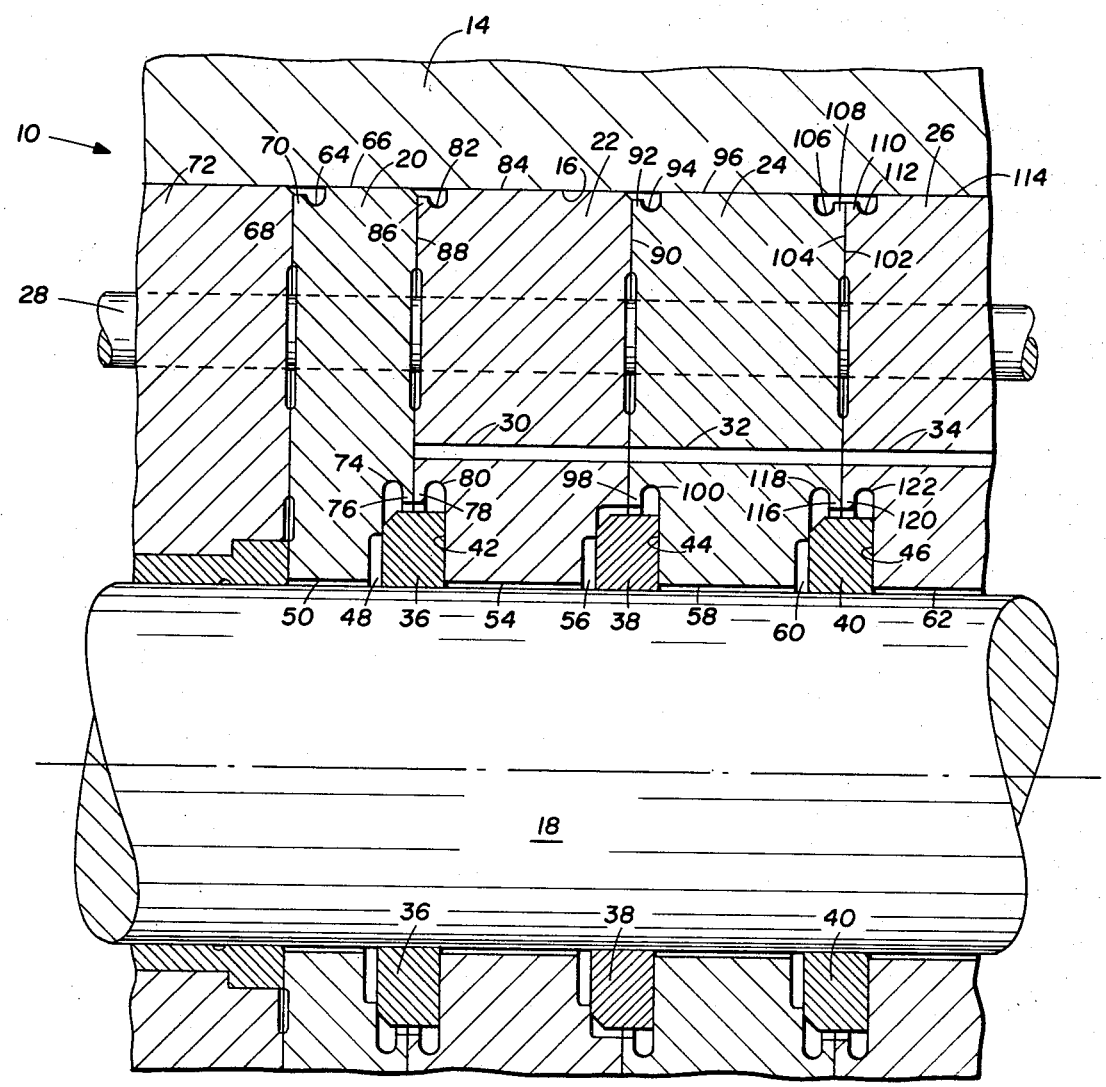

PACKING FOR COMPRESSORS, PUMPS OR THE LIKE

BACKGROUND OF THE INVENTION

This invention relates, generally, to improvements in pumps, compressors or the like. More specifically, but not by way of limitation, this invention relates to improved packing for use in a high pressure pump, compressor or the like.

It has been known in the past to employ annular packing members located within the cylinder sand in encircling relationship to a plunger reciprocating therethrough in high pressure, plunger type pumps or compressors. Typically, the annular packing members include one or more lubricant passageways extending therethrough and have counterbores located adjacent the plunger for carrying sealing rings that sealingly engage the plunger and the packing members. The annular packing members are retained in the apparatus by a plurality of bolts or studs that exert a clamping force thereon. The adjacent annular packing members are provided with flat, lapped faces, which form fluid-tight seals therebetween as a result of the relatively high intensity clamping forces exerted thereon during assembly.

While this arrangement has performed in a generally satisfactory manner, a good deal of care must be exerted both in the manufacture and in the assembly to assure that the lapped faces will, in fact, form a fluid-tight seal between adjacent packing members. Also, the high forces exerted in assembling the annular packing members in the apparatus have resulted in very high unit loading and stresses on the annular packing members. The stresses are usually developed along the annular line where the counterbore of one annular packing member engages the adjacent packing member. Since the annular packing members are exposed to extremely high pressures, that is, pressures in the neighborhood of 25,000 to 35,000 pounds per square inch during the compression stroke and drop suddenly to a relatively low level during the intake stroke, the stress concentrations frequently result in fatigue cracks.

When the annular packing members are subjected to such failures, the apparatus must be disassembled and new packing members placed therein. In the high pressure apparatus in which such packing members are utilized, the replacement of the annular packing members may be difficult and time consuming, not to mention the lost operation time of the apparatus while the replacement is being accomplished.

An object of this invention is to provide an improved packing member for compressors, pumps or the like that will have an extended service life.

Another object of the invention is to provide an improved annular packing member that eliminates the stress risers that were prevalent in the previously known packing members.

Still another object of the invention is to provide improved annular packing members wherein the pressures within the apparatus aid in forming fluid-tight seals between adjacent packing members.

A further object of the invention is to provide improved packing members for high-pressure apparatus that eliminate the necessity for imposing extremely high intensity clamping forces thereon and, yet, is effective in forming fluid-tight seals between adjacent annular packing members.

SUMMARY OF THE INVENTION

This invention provides an improved compressor, pump or the like including a cylinder and a plunger arranged for a reciprocating movement in the cylinder. The improvement comprises: first means having a bore arranged to encircle the plunger and having a generally radially disposed sealing surface; second means having a bore arranged to encircle the plunger and having a sealing surface sealingly engaging the sealing surface on the first means; and, one of the first and second means having a pressure responsive, annular lip thereon comprising a portion of the sealing surface. The annular lip is responsive to pressure in the compressor, pump or the like to urge the sealing surfaces into tighter sealing engagement.

The foregoing objects and advantages of the invention will become more apparent as the following detailed description is read in conjunction with the accompanying drawings.

BRIEF DESCRIPTION OF THE DRAWING

The single FIGURE of the drawing which is shown partly in cross section and partly in elevation, is a fragmentary view of a compressor employing improved annular packing members that are constructed in accordance with the invention.

DESCRIPTION OF THE PREFERRED EMBODIMENT

The single FIGURE of the drawing is a fragmentary view of a compressor 10 that includes a cylinder 14 having a bore 16 extending therethrough. Arranged for reciprocating movement through the bore 16 is a plunger 18.

Encircling the plunger 18 is a plurality of annular packing members 20, 22, 24, and 26. The packing members are each sized to fit within the bore 16 of the cylinder 14 and are retained in the assembled condition as illustrated by a plurality of tie rods or studs 28. Although only one stud 18 is shown, it will be understood that a plurality of the studs are arranged in circumferentially spaced relation whereby a relatively even clamping force can be exerted on the annular packing members.

To lubricate the plunger 18, lubricant holes 30, 32, and 34 have been formed in the annular members 22, 24, and 26, respectively, and are arranged in aligned relationship forming a continuous lubricant passageway. As illustrated, the lubricant passageway is located just above a plurality of spaced seal rings 36, 38, and 40.

The seal rings, 36, 38, and 40 may be of any suitable design and are arranged to closely receive the plunger 18 and to form a fluid-tight seal therewith as the plunger 18 reciprocates in the compressor 10. On the compression stroke of the plunger 18, the seal rings 36, 38, and 40 also engage surfaces 42, 44, and 46, respectively, to prevent the compressed fluid from bypassing the seal rings 36, 38, and 40.

The seal ring 36 is located in a cavity 48 that has been formed by counterboring the annular packing member 20 and the annular packing member 22 adjacent their inner peripheries 50 and 54, respectively. Similarly, the seal ring 38 is located in a cavity 56 that has been formed by counterboring the opposite end of the annular packing member 22 adjacent its inner periphery 54 and by counterboring the annular packing member 24 adjacent its inner periphery 58. The seal ring 40 is located in an annular cavity 60 that has been formed by counterboring the opposite end of the annular packing member 24 adjacent the inner periphery 58 and by counterboring the annular packing member 26 adjacent its inner periphery 62.

The packing member 20 has an annular groove 64 formed in its outer periphery 66. The groove 64 is located relatively near one end face 68 of the annular packing member 20 forming a pressure responsive annular lip 70 that is disposed in sealing engagement with an adjacent packing member 72.

An annular groove 74 is formed in the annular packing member 20 within the cavity 48 providing a pressure responsive annular lip 76 that is disposed in juxtaposition with and sealingly engages a pressure responsive annular lip 78 located on the packing member 22 that is also disposed within the cavity 48. The pressure responsive annular lip 78 is formed by an annular groove 80 that is located in the counterbore of the annular packing member 22 forming the cavity 48.

The annular packing member 22 also has an annular groove 82 located in its outer periphery 84 that provides a pressure responsive annular lip 86. The pressure responsive annular lip 86 is disposed in sealing engagement with an end face 88 located on the annular packing member 20.

In addition, the annular packing member 22 includes a second end face 90 that is disposed in sealing engagement with a pressure responsive annular lip 92. The lip 92 is formed by an annular groove 94 that extends around the outer periphery 96 of the annular packing member 24. The end face 90 is also in sealing engagement with a pressure responsive annular lip 98 located on the annular packing member 24 encircling the cavity 56. The lip 98 is formed by an annular groove 100 that extends around the cavity 56 in the packing member 24.

Mating end faces 102 and 104 on the annular packing members 24 and 26, respectively, are juxtaposed and in sealing engagement as shown in the drawing. The outer periphery 96 on the member 24 has an annular groove 106 formed therein providing a pressure responsive annular lip 108 that is in sealing engagement with a pressure responsive annular lip 110. The lip 100 is formed on the annular packing member 26 by an annular groove 112 that extends into the outer periphery 114 thereof.

Similarly, a pressure responsive annular lip 116 on the annular packing member 24 extends into the cavity 60 and is formed on the annular member 24 by an annular groove 118. Lip 116 is in sealing engagement with a pressure responsive annular lip 120 on the packing member 26. The lip 120 is formed by an annular groove 122 extending around the cavity 60 in the member 26.

When the compressor 10 is assembled, fasteners (not shown) on the studs 28 are tightened so that the desired force is imposed on the packing members to form an initial seal between the end surfaces thereon. During operation of the compressor 10, and as the plunger 18 moves on its compression stroke, relatively high pressures are exerted in the cavities 48, 56, and 60 due to the fluid-tight seals formed by the seal ring 36 with the plunger 18 and with the surface 42 of the member 22; the fluid-tight seal formed between the seal ring 38 and the plunger 18 and the surface 44 of the packing member 24; and, the fluid-tight seal formed between the seal ring 40 and the plunger 18 and with the surface 46 of the packing member 26.

In the cavity 48, the pressure acts upon the pressure responsive annular lips 76 and 78 urging them relatively together into tighter sealing engagement. Similarly, the pressure in the cavity 60 acts upon the pressure responsive annular lips 116 and 120 forcing them into tighter sealing engagement. In the cavity 56, the pressure acts upon the single pressure responsive annular lip 98 forcing it into tighter sealing engagement with the surface 90 of the annular packing member 22. It can be seen from the foregoing, that the initial sealing between the packing members as a result of the assembly is enhanced due to the presence of the pressure responsive annular lips. Also, with the use of the annular lips and the relatively large radius grooves forming the lips, the stress concentrations at the intersections between the cavities and the packing members are substantially reduced.

On the outer diameter of the annular seal members, that is, on their peripheries 66, 84, 96, and 114, substantially static pressure from the compressor discharge (not shown) in the grooves 64, 82, 94, 106, and 112 acts upon the pressure responsive annular lips 70, 86, 92, 108 and 110 forcing the lips into tighter sealing engagement with the adjacent sealing surfaces.

The problem of fatigue is virtually eliminated in the annular packing members described due to the relatively flexible nature of the annular lips and due to the generous radii provided in the various annular grooves forming the lips.

From the foregoing, it can be seen that a packing member constructed as described in detail hereinbefore provides packing members for pumps, compressors and the like that have an extended service life and consistently form effective seals even under the oscillating pressures encountered is such devices. These advantages are due to the reduction in the stress concentration and due to the use of the pressure responsive lips incorporated therein.

It will be understood that the foregoing is presented by way of example only and that many changes and modifications can be made thereto without departing from the spirit and scope of the invention.

The embodiments of the invention in which an exclusive property or privilege is claimed are defined as follows:

1. In an improved compressor, pump or the like including a cylinder and a plunger arranged for reciprocating movement in the cylinder, the improvement comprising:
   first means having a bore arranged to encircle the plunger and having a generally, radially disposed sealing surface;
   second means having a bore arranged to encircle the plunger and having a sealing surface sealingly engaging the sealing surface of said first means; and, one of the said first and second means having a pressure-responsive, annular lip thereon comprising a portion of said sealing surface, said lip being responsive to pressure in the compressor, pump or the like to hold said sealing surfaces in tighter sealing engagement.

2. The improvement of claim 1 wherein said first means and second means comprise first and second annular packing members arranged to be located in the cylinder.

3. The improvement of claim 2 wherein one of said first and second annular members has said annular lip located adjacent its outer periphery.

4. The improvement of claim 2 wherein one of said first and second annular members has said annular lip located adjacent its inner periphery.

5. The improvement of claim 3 and also including an annular lip located adjacent the inner periphery of one of said first and second annular members.

6. The improvement of claim 2 wherein said first and second annular members each have a radially oriented, annular lip.

7. The improvement of claim 6 wherein said annular lips are located adjacent the outer peripheries of said first and second annular members.

8. The improvement of claim 6 wherein said annular lips are located adjacent the inner peripheries of said first and second annular members.

9. The improvement of claim 6 wherein said annular lips on said first and second annular members are in juxtaposition.

10. The improvement of claim 6 wherein said annular members have radially oriented, annular lips located on both the inner and outer peripheries of each annular member, the lips on the inner peripheries are in juxtaposition, and the lips on the outer peripheries are in juxtaposition.

* * * * *